United States Patent
Anctil et al.

(10) Patent No.: US 7,228,140 B2
(45) Date of Patent: Jun. 5, 2007

(54) ENHANCEMENTS TO LOCATION-BASED SERVICES FUNCTIONALITY IN A RADIO TELECOMMUNICATION NETWORK

(75) Inventors: Susan Anctil, Dorval (CA); Jose Arturo Arreaga Garza, Saltillo (MX); Lan Tran, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1114 days.

(21) Appl. No.: 10/013,521

(22) Filed: Dec. 13, 2001

(65) Prior Publication Data
US 2002/0094822 A1    Jul. 18, 2002

Related U.S. Application Data

(60) Provisional application No. 60/262,092, filed on Jan. 16, 2001.

(51) Int. Cl.
*H04Q 7/20* (2006.01)
(52) U.S. Cl. ............... 455/456.2; 455/456.1; 455/404.2; 455/456.5; 455/433; 455/432.1
(58) Field of Classification Search ........... 455/456.2, 455/456.1, 404.2, 433, 432.1, 456.5
See application file for complete search history.

(56) References Cited

U.S. PATENT DOCUMENTS

| | | | |
|---|---|---|---|
| 5,809,424 A * | 9/1998 | Eizenhoefer | 455/456.2 |
| 6,002,932 A | 12/1999 | Kingdon et al. | 455/433 |
| 6,138,003 A | 10/2000 | Kingdon et al. | 455/410 |
| 6,236,852 B1 * | 5/2001 | Veerasamy et al. | 455/411 |

* cited by examiner

*Primary Examiner*—George Eng
*Assistant Examiner*—Huy Phan
(74) *Attorney, Agent, or Firm*—Ericsson Canada Inc.

(57) ABSTRACT

A system and method allow an authorized Service Application or an authorized network entity to retrieve a geographic position of a mobile station. A home Positioning Node for receiving a mobile station's geoposition request from the Service Application and for generating a Positioning Request message including a home Positioning Node identification parameter to a serving Positioning Node. The serving Positioning Node validates the home Positioning Node identification parameter prior to sending the geographic position of the mobile station to the Service Application. The home Positioning Node further accesses and stores data in an internal database. An anchor Switching Node for receiving, forwarding, processing, generating and sending Positioning Requests. The Anchor Switching Node further supports a mobile station's hand/off, retrieves the geographic position of the mobile station, and sends it to the authorized network entity.

15 Claims, 6 Drawing Sheets

ENHANCEMENTS TO LOCATION-BASED SERVICES FUNCTIONALITY IN A RADIO TELECOMMUNICATION NETWORK

PRIORITY STATEMENT UNDER 35 U.S.C S.119(e) & 37 C.F.R. S.1.78

This non-provisional patent application claims priority based upon the prior U.S provisional patent application entitled "ENHANCEMENTS TO LOCATION-BASED SERVICES FUNCTIONALITY IN A RADIO TELECOMMUNICATION NETWORK", application Ser. No. 60/262,092, filed Jan. 16, 2001, in the names of Susan Anctil, Jose Arturo Arreaga Garza and Lan Tran.

BACKGROUND OF THE INVENTION

1. Field of the Invention

The present invention relates to a system and method for retrieving the geographic position of a mobile station in a radio telecommunication network.

2. Description of the Prior Art

Nowadays, the mobility of a mobile subscriber is an important issue in a radio telecommunication network. It is essential that services for which a mobile station (MS) user has subscribed in his home network follow him whenever he roams in a network or hands off to another network. The mobility issue is well known in the art and described in a plurality of standards such as in the American National Standards Institute (ANSI). The ANSI-41 protocol defines the MS geographic position retrieval for a roaming subscriber. This allows providing a MS geographic position to service applications (SA) such as law enforcement, emergency services (e.g. 9-1-1 calls) and location-based services.

However, before providing the MS geographic position to service applications, an implementation of a MS location functionality has to be done in the radio telecommunication network. In a radio telecommunication network that follows the ANSI-41 protocol, a mobile switching center (MSC) provides and sends geographic location data of the MS to a mobile positioning center (MPC). A position determining entity (PDE) then calculates the geographic position of the MS by using geographic location data sent by the MSC. The MPC stores that geographic position and renders it available to authorized network entities.

Today, with the introduction of several service applications and various systems, it can be difficult for network operators to provide a high level of security. Consequently a mobile subscriber's privacy is questionable. It is described in a plurality of standards that a mobile subscriber is allowed to restrict the access to his geographic position. More particularly, in the ANSI-41 protocol a subscriber can activate/deactivate the presentation of his position. As an example, Location Information Restriction (LIR) restricts presentation of a MS position information in a radio telecommunication network.

There are two different aspects regarding the control of a mobile subscriber on his location information privacy. In a first aspect, the MS geographic position can be retrieved with the approbation of the MS user. A MS user can authorize a network operator or a service provider for retrieving his geographic position upon subscribing to available and offered services (e.g. location-based services) in his home network. In a secondary aspect, the MS geographic position can be retrieved without the approbation of the MS user (law enforcement or emergency services (e.g. 9-1-1 calls)). As known today, a plurality of governments from different countries have adopted laws regarding the implementation of these service applications in radio telecommunication networks.

Then, in a way to restrict the access to a mobile subscriber's location, it is necessary to make sure that the MS geographic position is requested by an approved network entity. It is essential for a network operator to certify that the network entity is therefore one that is authorized to ask for the MS geographic position. Consequently, there is a need to improve the security aspect related to geographic positioning of mobile stations and the providing of such information to service applications. The present invention provides a solution to this effect.

SUMMARY OF THE INVENTION

It is therefore one broad object of this invention to provide a high level of security for a geographic position of a Mobile Station (MS) by rendering the MS geographic position available only to authorized network entities or Service Applications.

More particularly, the present invention provides a system and method for retrieving the geographic position of the MS. The system and method comprise a home Positioning Node (PN) for receiving a MS Geoposition Request from a Service Application (SA), and for generating a Positioning Request message including a home Positioning Node identification parameter. The system and method further comprise a serving PN for receiving the Positioning Request, and for validating the home Positioning Node identification parameter prior to sending the geographic position of the MS to the SA. The home PN comprises an Input/Output Unit for receiving a MS Geoposition Request from the SA, for sending an Authorization Request message for requesting an authorization for the MS Geoposition Request to a Global Database (GD), for receiving an Authorization Response from the GD, for sending a Positioning Request message including the home Positioning Node identification parameter to a serving PN, and for receiving a Positioning Response from the serving PN. If a hand off has occurred, the system and method also comprises an anchor Switching Node (SN). The anchor SN comprises an Input/Output Unit for receiving the Positioning Request from the home PN via an anchor PN, for forwarding the Position Request to a serving PN via a serving SN, and for sending a Positioning Response to the anchor PN.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
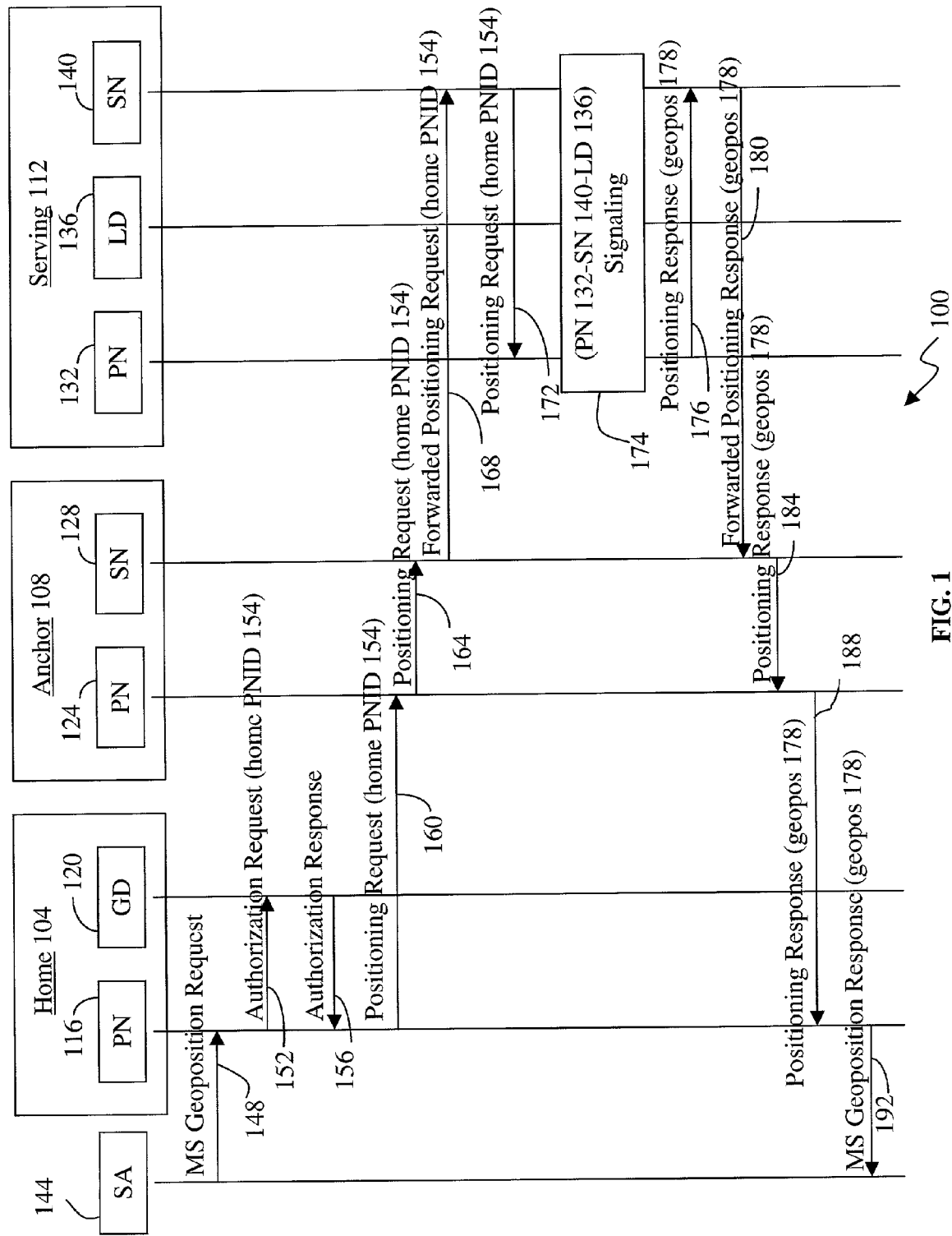
FIG. 1 is a message flow diagram illustrating the flow of messages in accordance with the invention for retrieving the geographic position of a Mobile Station in a Radio Telecommunication Network.

The following abbreviations are being used throughout the present application:
GD: Global Database
HLR: Home Local Register
ISPOSREQ: Intersystem Positioning Request
ISPOSREQFWD: Intersystem Positioning Request Forward
LCS: Location Services
LD: Location Detector
MPC: Mobile Positioning Center
MS: Mobile Station
MSC: Mobile Switching Center
PDE: Position Determining Entity
PN: Positioning Node
POSREQ: Positioning Request
RTN: Radio Telecommunication Network
SA: Service Application
SN: Switching Node Reference is now made to FIG. 1 there is shown a message flow diagram illustrating the flow of messages in the present invention for retrieving the geographic position of a Mobile Station (MS) (not shown) in a Radio Telecommunication Network (RTN) 100. The RTN 100 comprises a Home network 104, an Anchor network 108 and a Serving network 112. As well, each network (Home network 104, Anchor network 108 and Serving network 112) comprises different entities, which realize the steps of the invention. The Home network 104 comprises a Positioning Node (PN) 116 and a Global Database (GD) 120. The Anchor network 108 comprises a PN 124 and a Switching Node (SN) 128 while the Serving network 112 comprises a PN 132, a Location Detector (LD) 136 and a SN 140. The MS is registered in the Home network 104. If the MS is located in the Home network 104, the Home network 104 is called the serving network of the MS. However, the MS can roam in different networks. A network where the MS roams becomes the serving network of the MS. However, if the MS hands off to another network the original serving network will be called the anchor network and the new network where the MS is located becomes the serving network.

The flow of messages starts when a Service Application (SA) 144 requests the geographic position of an MS. The SA 144 sends to the home PN 116 an MS Geoposition Request 148 for requesting the geographic position of the MS. The home PN 116 obtains data from the MS Geoposition Request 148 and authenticates the SA 144. After that authentication, the PN 116 sends an Authorization Request 152 including a home Positioning Node identification parameter (home PNID 154) to the GD 120 for authorizing the MS Geoposition Request 148 and for obtaining data. The GD 120 authorizes the request and sends an Authorization Response 156 to the home PN 116. The Authorization Response 156 comprises a serving SN identification parameter and an associated serving PN network address. Subsequently, the PN 116 sends a Positioning Request 160 including the home Positioning Node identification parameter (home PNID 154) and the serving SN identification parameter to the identified PN 124. The PN 124 uses the home Positioning Node identification parameter (home PNID 154) to determine if the Positioning Request 160 has been originated from an authorized network entity. Following this determination, the PN 124 uses the received serving SN identification parameter for sending a Positioning Request 164 to the SN 128. The SN 128 is capable of determining if the MS has handed off to another network. If the MS has handed off to another network, the SN 128 forwards data obtained in the Positioning Request 164 in a Forwarded Positioning Request 168 to the new serving SN 140. Next, the serving SN 140 sends a Positioning Request 172 including the home Positioning Node identification parameter (home PNID 154) to the serving PN 132. The serving PN 132 uses the home Positioning Node identification parameter (home PNID 154) to determine if the Positioning Request 160 has been originated from an authorized network entity (home Positioning Node 116). Following this determination, the serving PN 132 uses data obtained in the Positioning Request 172 for selecting an appropriate LD (LD 136), which determines and sends the geographic position of the MS to the PN 132. More particularly, the selected LD 136 determines the geographic position of the MS by communicating with the SN 140 and the PN 132, "(PN 132-SN 140-LD 136) Signaling" 174. Next, the serving PN 132 replies to the Positioning Request 172 with a Positioning Response 176 including the geographic position of the MS (geopos 178). The SN 140 is then able to answer to the Forwarded Positioning Request 168 received from the anchor SN 128 with a Forwarded Positioning Response 180 including the geographic position of the MS (geopos 178). The SN 128 then answers the Positioning Request 164 from the PN 124 with a Positioning Response 184 including the geographic position of the MS (geopos 178). Following that message, the PN 124 returns the geographic position of the MS (geopos 178) to the PN 116 in a Positioning Response 188. Afterwards, the PN 116 sends a MS Geoposition Response 192 including the geographic position of the MS (geopos 178) to the requesting SA 144.

The invention can be applied to a plurality of telecommunication network protocols known in the art. As an example we refer now to FIG. 2. In FIG. 2 there is shown a message flow diagram similar to FIG. 1, but now applied to the signaling in an ANSI-41 network. The ANSI-41 network 200 comprises a Home network 204, an Anchor network 208 and a Serving network 212. As well, each network (Home network 204, Anchor network 208 and Serving network 212) comprises different entities, which realize the steps of the invention. The Home network 204 comprises a Mobile Positioning Center (MPC) 216 and a Home Location Register (HLR) 220. The Anchor network 208 comprises a MPC 224 and a Mobile Switching Center (MSC) 228 while the Serving network 212 comprises a MPC 232, a Position Determining Entity (PDE) 236 and a MSC 240. The MS (not shown) is registered in the Home network 204. If the MS is located in the Home network 204, the Home network 204 is called the serving network of the MS. However, the MS can roam in different networks. A network where the MS roams becomes the serving network of the MS. However, if the MS hands off to another network the original serving network will be called the anchor network and the new network where the MS is located becomes the serving network.

The flow of messages depicted in FIG. 2 starts when a Location Services Client (LCS Client) 244 requests the geographic position of an MS. The LCS Client 244 sends to the MPC 216 an Intersystem Positioning Request (ISPOSREQ) 248 for retrieving the geographic position of the MS. The ISPOSREQ 248 includes a Position Quality of Service parameter (PQoS) for specifying the required quality of service for the MS position, a LCS Client identification parameter (LCSCID) for identifying the LCS Client 244 and authentication data parameter (Authentication_Data) for authenticating the LCS Client 244 in the MPC 216. With the parameters and data included in the ISPOSREQ 248, the MPC 216 authenticates the LCS Client 244 and verifies that the LCS Client 244 is authorized to request the MS geographic position. Next, the MPC 216 sends to the HLR 220 a Positioning Request (POSREQ) 252 message including the LCSCID and a home MPC identification parameter (MPCID) for authorizing the ISPOSREQ 248, and for obtaining data. More particularly, the HLR 220 validates the identity of the LCS Client 244 using the received LCSCID and a list of valid LCS Clients, authorizes the ISPOSREQ 248, and sends a posreq 256 to the home MPC 216 for authorizing the ISPOSREQ 248. The posreq 256 comprises an MS identification parameter (MSID) for identifying the MS, a network address (MPCADRR) of the MPC 224 associated with the MSC 228 where the MS last registered and a MSC identification parameter (MSCID) for identifying the MSC (MSC 228). Subsequently, the MPC 216 sends an ISPOSREQ 260 to the identified MPC 224. The ISPOSREQ 260 comprises the received PQoS, MSID, MSCID, LCSCID and home MPC identification parameter (MPCID (home)). The MPC 224 uses the MPCID(home) to verify that the ISPOSREQ 260 has been originated from an authorized entity (MPC 216). Following this determination, the MPC 224 sends an ISPOSREQ 264 to the MSC 228 by using the received MSCID. The MSC 228 is capable of determining if the MS has handed off to another network. If the MS has handed off to another network, the MSC 228 forwards the required parameters obtained in the ISPOREQ 264 (MSID, LCSCID, PQOS, and MPCID(home)) in an Intersystem Positioning Request Forward (ISPOSREQFWD) 268 to the new serving MSC 240. The serving MSC 240 sends to the associated MPC 232 an ISPOSREQ 272 including the MS information (MOBINFO) needed to determine the MS geographic position, the MS positioning capabilities (MPCAP parameter), the MSID, the received PQoS and the MPCID(home). The MPC 232 uses the MPCID(home) parameter to verify that the request for the MS geographic position has been originated from an authorized entity (MPC 216). Following this determination, the serving MPC 232 uses the PQoS and the MPCAP parameter for selecting an appropriate PDE (PDE 236), which determines and sends the geographic position of the MS to the MPC 232. More particularly, the selected PDE 236 determines the geographic position of the MS by communicating with the MSC 240 and the MPC 232, "(MPC 232-MSC 240-PDE 236) Signaling" 274. Subsequently, the MPC 232 replies to the ISPOSREQ 272 with an isposreq 276 including the geographic position of the MS (POSINFO parameter). Upon receiving this information, the MSC 240 answers the ISPOSREQFWD 268 by sending an isposreqfwd 280 including the received POSINFO parameter to the MSC 228. The MSC 228 returns the POSINFO parameter to the MPC 224 by sending an isposreq 284. The MPC 224 returns the POSINFO parameter to the MPC 216 in an isposreq 288. Afterwards, the MPC 216 generates and sends an isposreq 292 including the geographic position of the MS (POSINFO parameter) to the requesting LCS Client 244.

Figure 2:
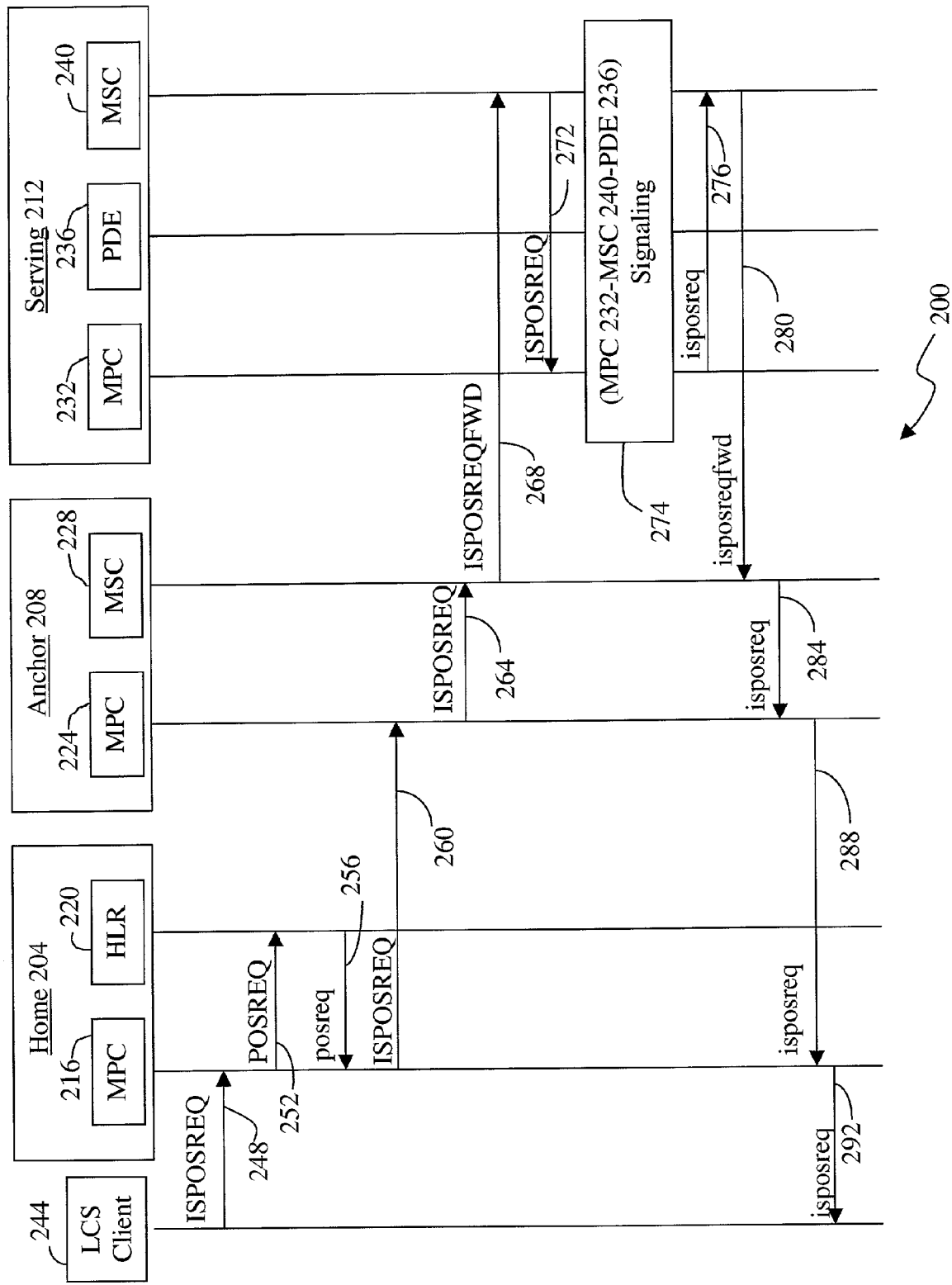
FIG. 2 is a message flow diagram illustrating the flow of messages in an ANSI-41 network.
Figure 3:
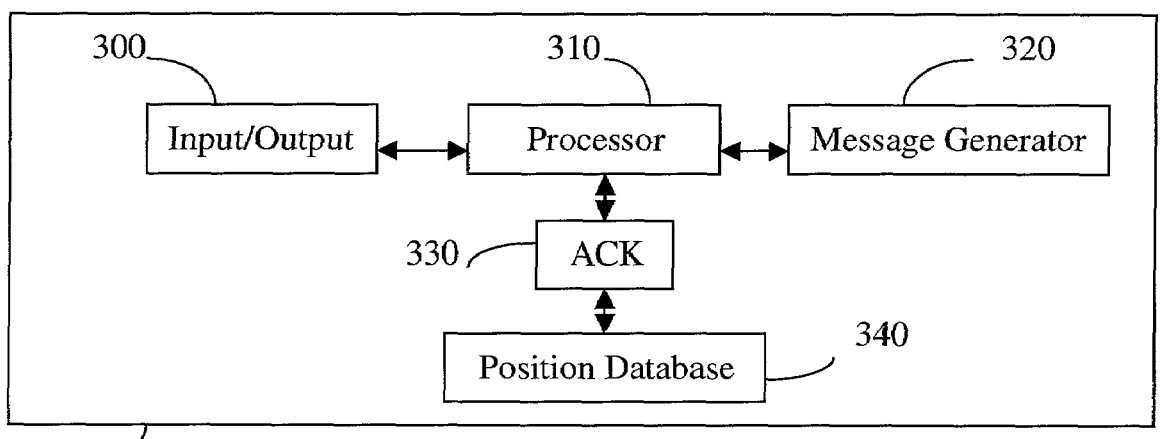
FIG. 3 is a block diagram illustrating a Positioning Node.
Figure 4:
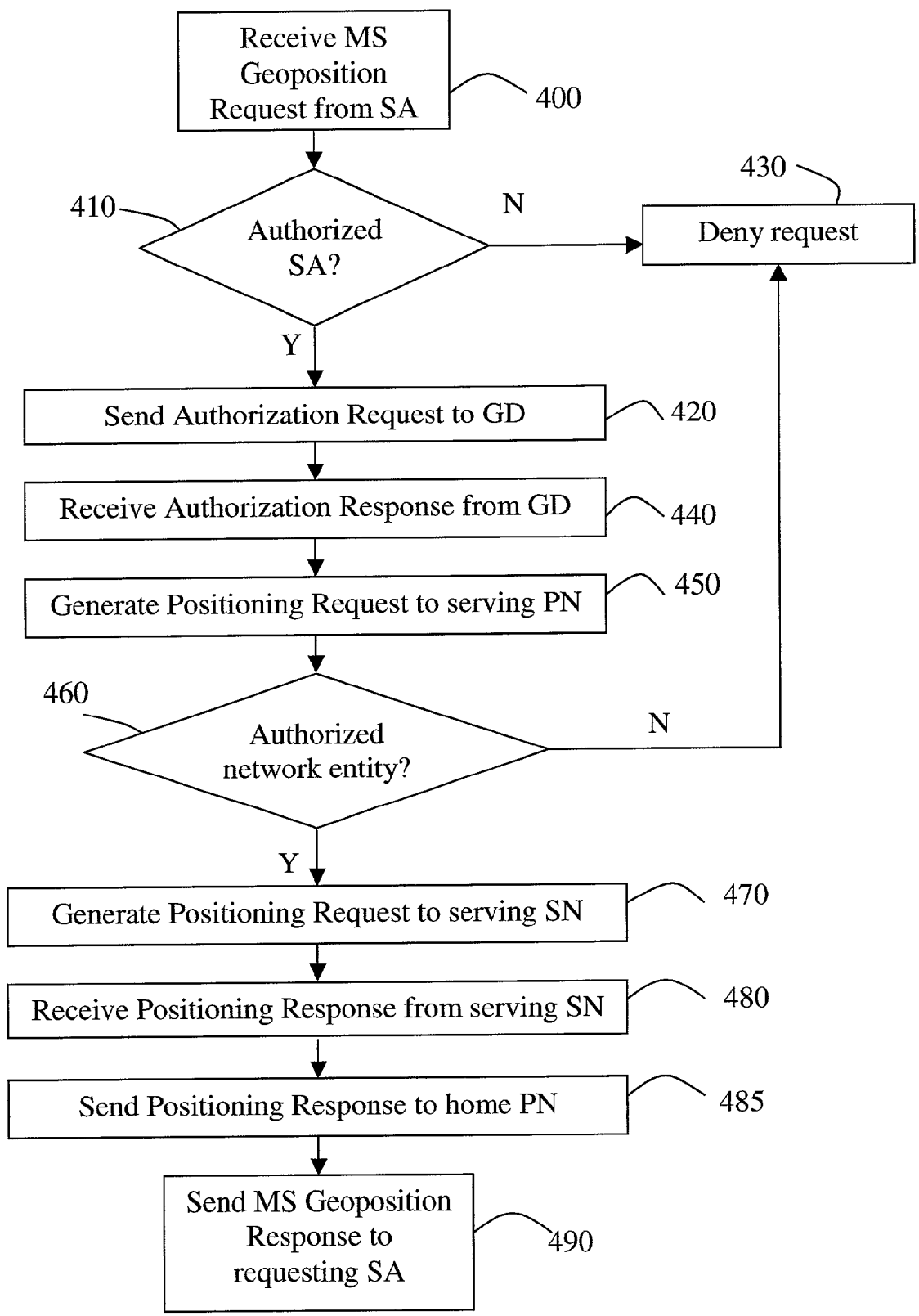
FIG. 4 is a flow chart illustrating positioning of the Mobile Station in the Radio Telecommunication Network.

Reference is now made to FIG. 3, which is a block diagram illustrating the PN 116, FIG. 4, which is a flow chart that demonstrates the steps for positioning the MS in the RTN 100 and further to FIG. 1. The PN 116 comprises an Input/Output Unit 300 for receiving messages from other network entities and Service Applications, and sending generated messages, a Processor 310 for processing messages, a Message Generator 320 for generating outgoing messages, an Acknowledge functionality (ACK) 330 for accessing an internal database, and a Position Database 340 for storing the geographic position of mobile stations. At step 400, the PN 116 receives the MS Geoposition Request 148 from the SA 144 at the Input/Output Unit 300. At step 410, the Processor 310 verifies that the SA 144 is authorized to request the MS geographic position. If the SA 144 is authorized, the PN 116 will generate and send the Authorization Request 152 to the GD 120 at step 420. If not, the PN 116 will deny the MS Geoposition Request 148, generate and send a message to the requesting SA 144 at step 430. The following steps are executed in the case that the SA 144 is an authorized SA. At step 440, the PN 116 receives an Authorization Response 156 from the GD 120. Subsequently, the PN 116 generates the Positioning Request 160 to the PN 124, at step 450. At step 460, the PN 124 uses the home Positioning Node identification parameter (home PNID 154) included in the Positioning Request 160 to determine if the Positioning Request 160 has been originated from an authorized network entity. If the network entity (PN 116) is not authorized, the PN 124 will generate a message for denying the request (step 430). If the request has been originated from an authorized entity, the PN 124 generates the Positioning Request 164 to its associated SN 128 (step 470) and receives the Positioning Response 184 from the SN 128 (step 480) prior to sending the Positioning Response 188 to the home PN 116, at step 485. The Processor 310 processes the Positioning Response 188 received from the PN 124 and, by using the ACK 330, stores the geographic position data of the MS (geopos 178) obtained from the Positioning Response 188 in the Position Database 340. Next, the geographic position data of the MS is returned to the requesting SA 144 at step 490. More particularly, the Processor 310 processes the request from the SA 144 and the ACK 330 allows accessing the geographic position of the MS stored in the Position Database 340.

Figure 5:
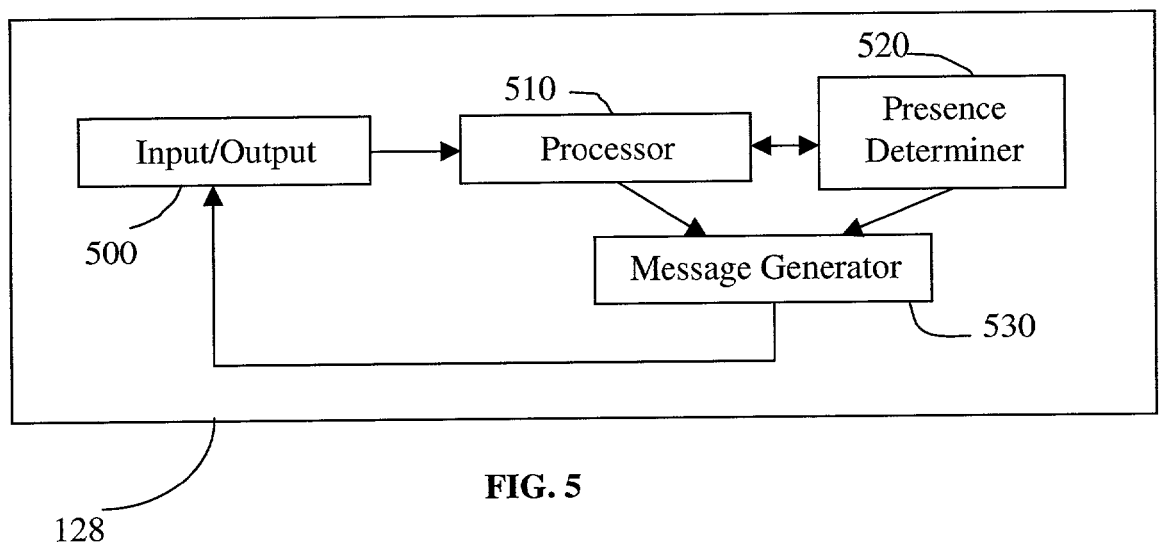
FIG. 5 is a block diagram illustrating a Switching Node.
Figure 6:
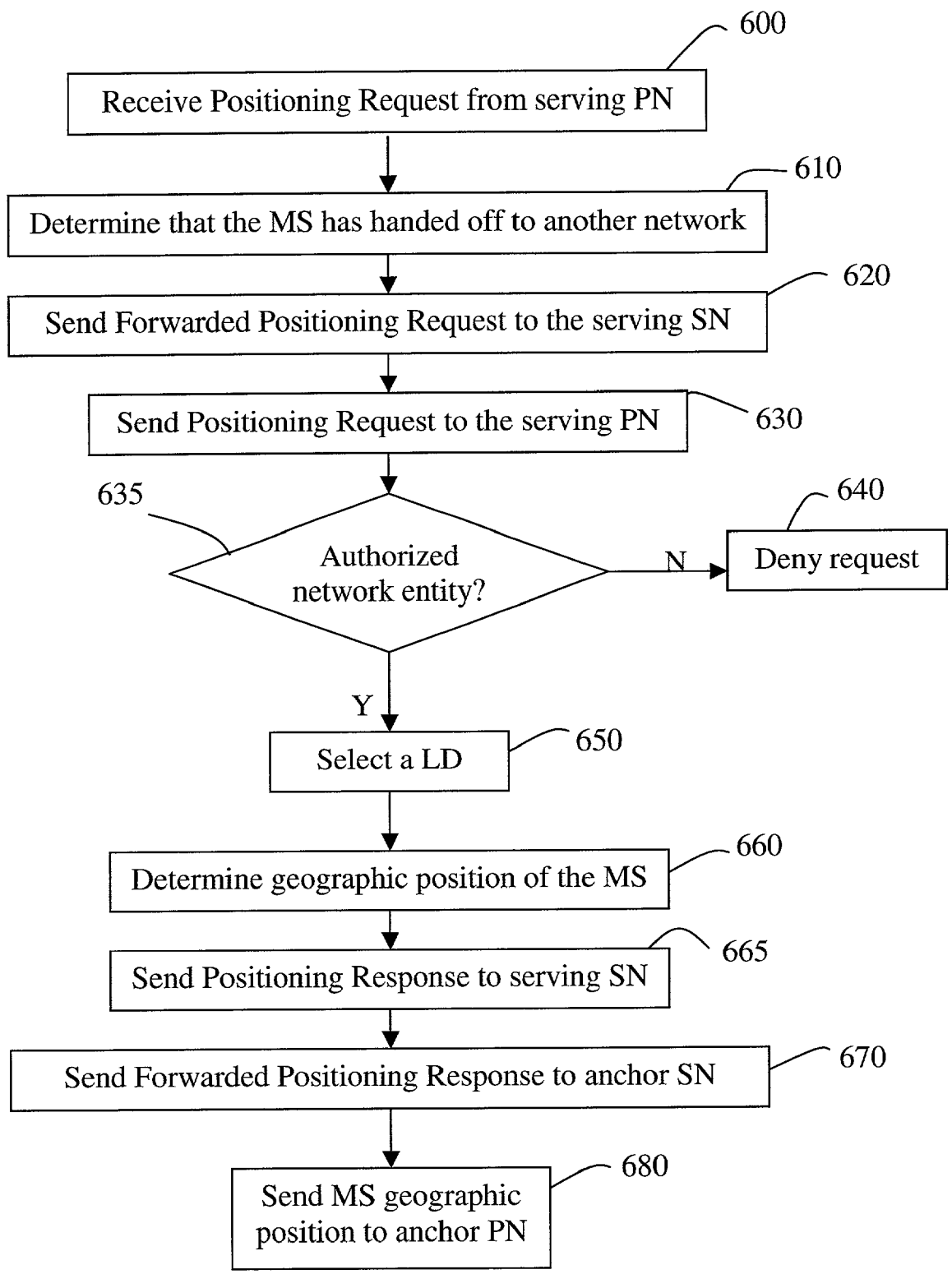
FIG. 6 is a flow chart illustrating retrieval of the geographic position of the Mobile Station in the Radio Telecommunication Network.

Reference is now made to FIG. 5, which is a block diagram illustrating the SN 128, FIG. 6, which is a flow chart that demonstrates the steps for retrieving the geographic position of the MS in the RTN 100, and further to FIG. 1. The SN 128 comprises an Input/Output Unit 500 for receiving messages from other network entities and for sending generated messages, a Processor 510 for processing messages, a Presence Determiner 520 for determining that a MS has handed off to another network and a Message Generator 530 for generating outgoing messages. At step 600, the SN 128 receives the Positioning Request 164 from the PN 124. At step 610, the Presence Determiner determines that the MS has handed off to another network. Following this determination, the SN 128 forwards data obtained from the Positioning Request 164 to the new serving SN 140 in the Forwarded Positioning Request 168, at step 620. Next, the SN 140 sends the Positioning Request 172 to the new serving PN 132 (step 630). At step 635, the PN 132 uses the home Positioning Node identification parameter (home PNID 154) to verify if the Positioning Request 172 has been originated from an authorized network entity (PN 116). If the Positioning Request 172 is not from an authorized network entity, the PN 132 will deny the Positioning Request 172 (step 640). The following steps are executed in the case that the PN 116 is an authorized entity. At step 650, the PN 132 selects an appropriate LD (LD 136) based on the data obtained from the Positioning Request 172. In return, at step 660 the LD communicates with the serving SN 140 and the serving PN 132 for determining and sending the geographic position of the MS (geopos 178) to the PN 132. At step 665, the PN 132 sends the geographic position of the MS (geopos 178) in the Positioning Response 176 to the SN 140. Following this message, the SN 140 sends the obtained geographic position of the MS (geopos 178) in the Forwarded Positioning Response 180 to the anchor SN 128, at step 670. Afterwards, at step 680, the anchor SN 128 processes and generates the Positioning Response 184 including the geographic position of the MS (geopos 178) to the requesting PN 124.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system comprising:
    a home positioning node that receives a mobile station's geoposition request from a service application, and generates a home positioning node's positioning request message including a home positioning node identification parameter;
    an anchor positioning node that receives the home positioning node's positioning request, validates the home positioning node identification parameter, and generates an anchor positioning node's positioning request message including the home positioning node identification parameter;
    an anchor switching node that receives the anchor positioning node's positioning request, processes the anchor positioning node's positioning request, and forwards the anchor positioning node's positioning request in a forwarded positioning request after the mobile station hands off to another network;
    a serving switching node that receives the forwarded positioning request, and sends a serving switching node's positioning request including the home positioning node identification parameter; and
    a serving positioning node that receives the serving switching node's positioning request, and validates the home positioning node identification parameter prior to returning a geographic position of a mobile station.

2. The system of claim 1, further comprising a home global database wherein:
    the home positioning node further sends to the home global database an authorization request message for authorizing the mobile station's geoposition request; and
    the home global database receives the authorization request, authorizes the mobile station's geoposition request, and sends an authorization response to the home positioning node.

3. The system of claim 1, wherein:
    the serving switching node further receives the positioning response, and forwards the positioning response in a forwarded positioning response; and
    the anchor switching node further receives the forwarded positioning response, and sends a positioning response including the geographic position of the mobile station to the anchor positioning node.

4. The system of claim 1, wherein:
    the serving positioning node becomes the anchor positioning node when the MS hands off to another network and the anchor positioning node becomes the serving positioning node when the MS roams in the anchor network; and
    the serving switching node becomes the anchor switching node when the MS hands off to another network and the anchor switching node becomes the serving switching node when the MS roams in the anchor network.

5. The system of claim 1, wherein:
    the serving positioning node further includes the geographic position of the mobile station in a positioning response;
    the home positioning node further receives the positioning response prior to sending the geographic position of the mobile station to the service application; and the serving positioning node further generates a mobile station's geoposition response including the geographic position of the mobile station.

6. The system of claim 1, wherein the home positioning node comprises:
    an input/output unit for receiving the mobile station's geoposition request from the service application, sending the authorization request message to the global database, receiving the authorization response from the global database, sending the positioning request message including the home positioning node identification parameter to the serving positioning node, and receiving the positioning response from the serving positioning node.

7. The system of claim 1, wherein the home positioning node further comprises:
    a processor that processes the mobile station's geoposition request received at the input/output unit, and for processing the authorization response.

8. The system of claim 1, wherein the home positioning node further comprises:
    a message generator that generates the positioning request message, and generates the authorization request message.

9. The system of claim 1, wherein the home positioning node further comprises:
    a position database that stores geographic position of mobile stations; and
    an acknowledge functionality that accesses the position database.

10. A method for retrieving a geographic position of a mobile station, the method comprising steps of:
    receiving at a home positioning node a mobile station's geoposition request from a service application;
    generating at the home positioning node a home positioning node's positioning request message including a home positioning node identification parameter;
    receiving the home positioning node's positioning request at an anchor positioning node;
    validating the home positioning node identification parameter;
    generating at the anchor positioning node an anchor positioning node's positioning request including the home positioning node identification parameter;
    sending the anchor positioning node's positioning request from the anchor positioning node to an anchor switching node;
    receiving the anchor positioning node's positioning request at the anchor switching node;
    forwarding the positioning request in a forwarded positioning request after the mobile station has handed off to another network;
    receiving the forwarded positioning request at a serving switching node; and sending to a serving positioning node a serving switching node's positioning request including the home positioning node identification parameter;

receiving the serving switching node's positioning request at the serving positioning node; and validating the home positioning node identification parameter prior to returning the geographic position of the mobile station.

11. The method for retrieving a geographic position of a mobile station of claim 10, wherein the step of receiving at the home positioning node the mobile station's geoposition request from the service application further comprising steps of:

generating at the home positioning node an authorization request for authorizing the mobile station's geoposition request;

sending the authorization request from the home positioning node;

receiving the authorization request at a global database;

authorizing the mobile station's geoposition request at the global database;

generating an authorization response at the global database; and sending the authorization response from the global database to the home positioning node.

12. The method for retrieving a geographic position of a mobile station of claim 10, wherein the step of receiving the positioning request at the anchor positioning switching node further comprising the step of:

detecting that the mobile station has handed off to another network.

13. The method for retrieving a geographic position of a mobile station of claim 10, wherein the method further comprising steps of:

generating at the serving positioning node a positioning response including the geographic position of the mobile station;

sending the positioning response from the serving positioning node;

receiving the positioning response at the serving switching node, and forwarding the positioning response in a forwarded positioning response;

receiving the forwarded positioning response at the anchor switching node; and sending a positioning response including the geographic position of the mobile station to the anchor positioning node.

14. The method for retrieving a geographic position of a mobile station of claim 10, wherein the method further comprising steps of:

generating at the serving positioning node a positioning response including the geographic position of the mobile station;

sending from the positioning response from the serving positioning node; and receiving the positioning response at the home positioning node prior to sending the geographic position of the mobile station to the service application.

15. The method for retrieving a geographic position of a mobile station of claim 10, wherein the method further comprising the step of:

generating at the serving positioning node a mobile station's geoposition response including the geographic position of the mobile station.

* * * * *